United States Patent [19]
Baker et al.

[11] Patent Number: 6,032,448
[45] Date of Patent: Mar. 7, 2000

[54] APPARATUS FOR WRAPPING FIBRE OPTIC CABLE AROUND AND OVERHEAD LINE

[75] Inventors: James Charles Baker, Oxfordshire; David Dale Appleford, Wiltshire, both of United Kingdom

[73] Assignee: Focas Limited, Wiltshire, United Kingdom

[21] Appl. No.: 08/945,094

[22] PCT Filed: Mar. 29, 1996

[86] PCT No.: PCT/GB96/00753

§ 371 Date: Oct. 10, 1997

§ 102(e) Date: Oct. 10, 1997

[87] PCT Pub. No.: WO96/32661

PCT Pub. Date: Oct. 17, 1996

[30] Foreign Application Priority Data

Apr. 11, 1995 [GB] United Kingdom .................. 9507492

[51] Int. Cl.[7] ............................................. D02G 3/36
[52] U.S. Cl. ............................... 57/10; 57/18; 242/441.3
[58] Field of Search ................................ 57/3, 6, 10, 18, 57/19; 242/441.3, 441.4

[56] References Cited

U.S. PATENT DOCUMENTS

| | | | |
|---|---|---|---|
| 1,381,889 | 6/1921 | Atwood | 57/18 |
| 1,381,933 | 6/1921 | Riecken | 57/18 |
| 2,402,172 | 6/1946 | Macy | 175/376 |
| 2,663,544 | 12/1953 | Harley | 242/441.3 |
| 2,733,753 | 2/1956 | Schlesselman et al. | 242/441.3 |
| 3,174,725 | 3/1965 | Pfundt | 254/134.3 |
| 4,019,715 | 4/1977 | Vugrek | 254/134.3 |
| 4,311,299 | 1/1982 | Elliott, Jr. | 254/134.3 |
| 4,424,954 | 1/1984 | Innes | 57/3 |
| 4,628,675 | 12/1986 | Sakamoto | 57/3 |
| 4,715,582 | 12/1987 | Ikeda et al. | 254/134.3 CL |

FOREIGN PATENT DOCUMENTS

| | | |
|---|---|---|
| 3101278 | 1/1982 | Germany . |
| 3702781 | 8/1988 | Germany . |
| 708227 | 4/1954 | United Kingdom . |
| 2 173471 | 10/1996 | United Kingdom . |

OTHER PUBLICATIONS

International Conference of Large High Voltage Electric Systems, 1988 Session– Aug. 28th–Sept. 3rd, CIGRE', Paris– The development of wrap–on optical cables for use on the earthwires of high voltage power line, by C.N. Carter et al, 22–08, p. 1 Aug. 1988.

*Primary Examiner*—William Stryjewski
*Attorney, Agent, or Firm*—Westman, Champlin & Kelly, P.A.

[57] ABSTRACT

An apparatus for wrapping fiber optic cable around an overhead line (A), has a carriage (1) which sits on the overhead line (A) and is movable along the overhead line (A). A supply of fiber optic cable (B) is located on one side of the carriage (1) and a counterbalance (3) for the cable supply is located on the other side of the carriage (1). A gear set (4) is arranged to the fiber optic cable (B) around the overhead line (1). A substantially constant tension is applied to the fiber optic cable (B) during all modes of operation of the apparatus.

8 Claims, 2 Drawing Sheets

APPARATUS FOR WRAPPING FIBRE OPTIC CABLE AROUND AN OVERHEAD LINE

BACKGROUND OF THE INVENTION

The present invention relates to an apparatus for wrapping fiber optic cable around an overhead line. The term "overhead line" is intended to be a general reference to phase and earth conductors of overhead power lines and messenger cables strung between power lines and other such lines which pass overhead.

Fiber optic cables are now a well known and developed art and are increasingly replacing older forms of cabling in the field of communication.

Fiber optic cables can be employed to provide communication links based on power distribution networks. Conveniently, the fiber optic cable is wound directly onto the already established overhead line, thus utilising the networks which already exist thereby linking control centres and sub-stations etc.

It is already known to use a suitable apparatus which can move along an overhead line and simultaneously wrap the fiber optic cable around the overhead line. However, there is now a demand for an apparatus which is capable of applying the fiber optic cable to the overhead lines at a substantially constant tension thereby ensuring that the cable remains stable with respect to the conductor over a range of environmental conditions. In addition, the apparatus must necessarily come to a halt upon completing a span and while being manhandled may even be pushed backwards over a limited travel. It is essential under all these conditions that the applied tension is maintained.

SUMMARY OF THE INVENTION

The present invention provides an apparatus for wrapping fiber optic cable around an overhead line, comprising a carriage which sits on the overhead line and is moveable along the overhead line, a supply of fiber optic cable located on one side of the carriage and a counterbalance for the cable supply located on the other side of the carriage, gear means arranged to cause rotation of the carriage around the overhead line when the carriage moves along the overhead line thereby wrapping the fiber optic cable around the overhead line wherein tensioning means are provided which apply a substantially constant tension to the fiber optic cable during all modes of operation of the apparatus.

Preferably, the tensioning means comprises a pulley arrangement around which the fiber optic cable passes after leaving the supply and before being wrapped onto the overhead line.

Preferably, the pulley arrangement comprises a pulley around which the cable passes and a substantially constant biasing means acting on the pulley wherein, as the cable is installed, the opposing forces of the biasing means and the tension in the cable are substantially balanced.

Preferably, the pulley arrangement includes a brake means acting on the drum which is released after a predetermined length of cable has been paid out.

Preferably, over a limited backward travel of the carriage, the predetermined length of cable is taken back under the substantially constant cable tension.

DESCRIPTION OF THE PREFERRED EMBODIMENTS

Figure 1:
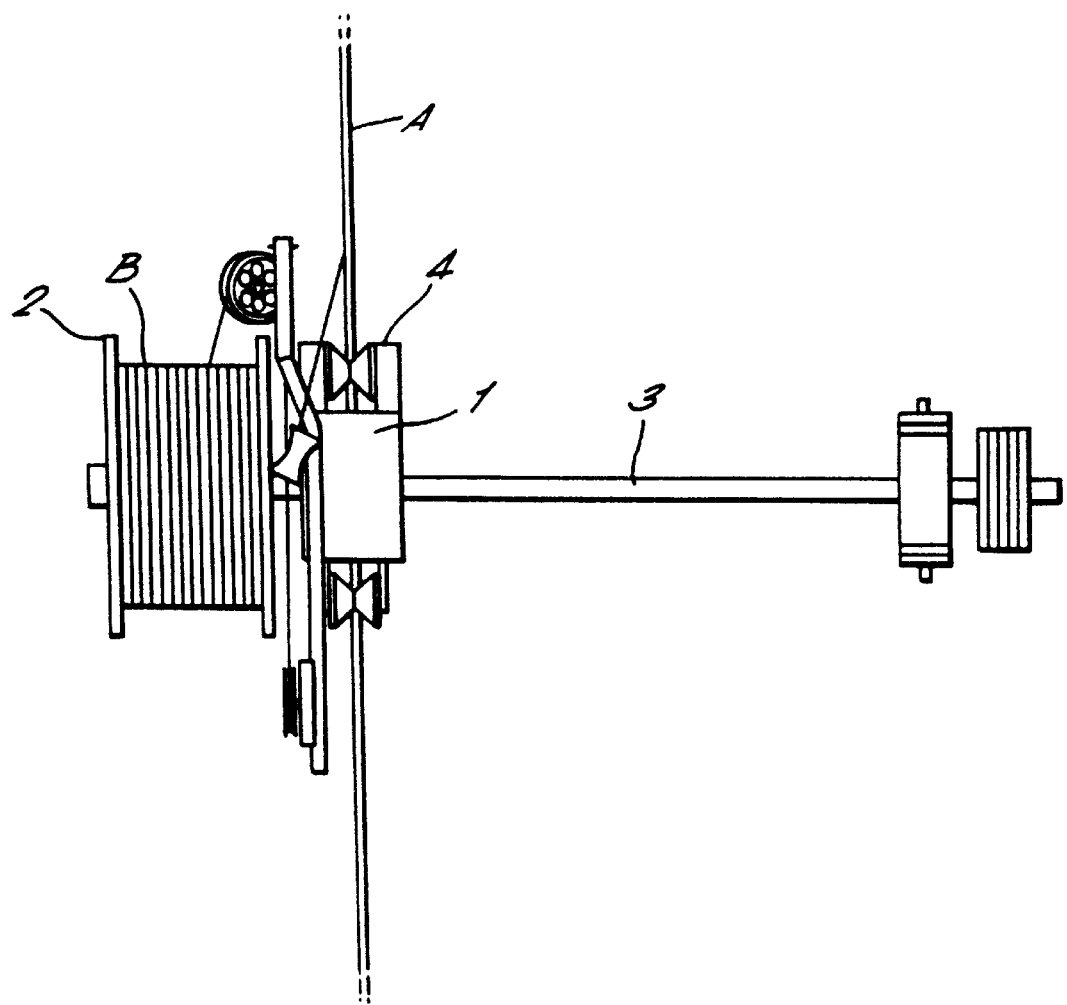
FIG. 1 is a perspective view of an apparatus according to the present invention.

In FIG. 1, an apparatus is depicted for wrapping fiber optic cable around an overhead line. The apparatus comprises a carriage 1 which sits on the overhead line A and is moveable along the overhead line. On one side of the carriage 1 a supply of fiber optic cable B is located on a drum 2. On the other side of the carriage 1 there is a counterbalance 3 for the drum 2 which tracks inwardly as the fiber optic cable B is applied to the overhead line A. A gear means 4 is also provided which causes rotation of the carriage 1 around the overhead line A when the carriage I moves along the overhead line which enables the fiber optic cable B to be wrapped around the overhead line A. The apparatus also includes a tensioning means (5,6,7,8,9,10,11) which applies a substantially constant tension to the fiber optic cable B as it is wrapped around the overhead line A.

Figure 2:
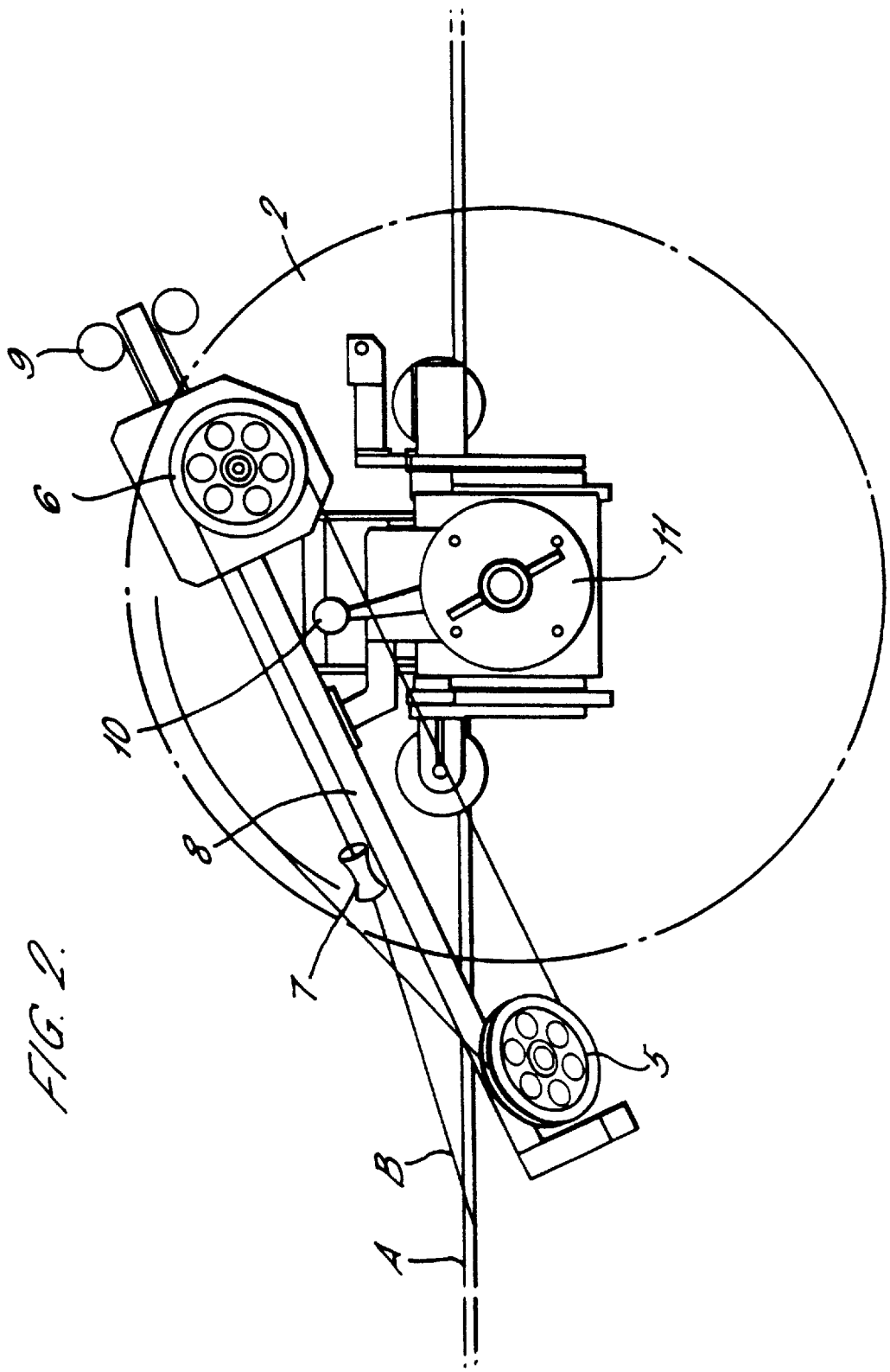
FIG. 2 shows details of the tensioning means in the apparatus in FIG. 1.

FIG. 2 shows further details of the tensioning means which comprises two pulleys 5 and 6 around which the fiber optic cable B passes before entering a guide trumpet 7 and then being applied to the overhead line A. The fiber optic cable B is folded back on itself as it is paid out from the drum 2. Pulley 6 runs on a linear guide 8 but is restrained by a spring 9 which ensures that tension is maintained in the fiber optic cable B. When the carriage 1 first starts to move the drum 2 is locked and a predetermined length of cable B will be paid out. The tension in the cable B is maintained at all times because the cable tension is balanced by the substantially constant spring tension of spring 9. When the pulley 6 nears the end of its travel, it reaches an equilibrium position which is the point at which it moves a lever 10 which acts to release the drum 2. The lever 10 controls a brake 11 on drum 2 and the brake allows the drum to slip so that cable B is paid out under tension. If the carriage 1 should be pushed backwards, the drum 2 is immediately locked but the cable tension is maintained, over a limited travel, as the pulley 6 takes back the predetermined length of cable B. Thus, the substantially constant force in the spring 9 balances the tension in the cable B, during all modes of operation of the apparatus, as required.

With an apparatus according to the present invention the following advantages are obtained:

(1) A substantially constant tension can be applied to the fiber optic cable regardless of the quantity of cable remaining on the drum;

(2) No operator adjustment is required on site; and (3) Tension in the fiber optic cable is maintained at all times and under most foreseeable conditions thereby greatly reducing the risk of the cable being installed with insufficient tension.

What is claimed is:

1. An apparatus for wrapping fiber optic cable around an overhead line, comprising:

a carriage which sits on the overhead line and is moveable along the overhead line;

a supply of fiber optic cable located on one side of the carriage and a counterbalance for the cable supply located on the other side of the carriage;

gears arranged to cause rotation of the carriage around the overhead line when the carriage moves along the overhead line thereby wrapping the fiber optic cable around the overhead line;

a length of said optical cable extending from said supply to said overhead line; and a cable tensioner arranged to apply a substantially constant tension to said length of optical cable as the apparatus is operated for wrapping said cable around said overhead line.

2. An apparatus as claimed in claim 1 wherein the cable tensioner comprises a pulley arrangement around which the fiber optic cable passes after leaving the supply and before being wrapped onto the overhead line.

3. An apparatus as claimed in claim 2, wherein the pulley arrangement comprises a pulley around which the cable passes and a substantially constant biasing means acting on the pulley wherein, as the cable is wrapped about the overhead line, the opposing forces of the biasing means and the tension in the cable are substantially balanced.

4. An apparatus as claimed in claim 3, wherein said supply includes a drum carrying the cable and the pulley arrangement includes a brake acting on the drum which is released after a predetermined length of cable has been paid out.

5. An apparatus as claimed in claim 1, wherein the cable tensioner is operative to pull back from the overhead line up to a predetermined length of said optical cable under said substantially constant tension during backward travel of the carriage.

6. Apparatus for wrapping fiber optic cable around an overhead line comprising a carriage for running along the overhead line, a rotary mount for a drum carrying a supply of fiber optic cable located on one side of the carriage, a counterbalance for the weight of the cable supply located on the other side of the carriage, a gear drive to cause rotation of the carriage around the overhead line when the carriage moves forward along the overhead line whereby optical cable from the supply is wrapped around the overhead line, a pulley around which fiber optic cable from the supply is folded back on itself before extending to said overhead line, a linear guide along which the pulley is moveable, and a tensioner which biases the position of the pulley to maintain a substantially constant tension in the fiber optic cable extending to the overhead line.

7. Apparatus as claimed in claim 6 further comprising a brake to act on said drum to prevent fiber optic cable being unwound from the drum, and a brake release operated only on movement of said pulley along said guide against said tensioner bias to predetermined equilibrium position, at which said cable can then be unwound from said drum on continuing forward movement of said carriage.

8. Apparatus as claimed in claim 7 wherein said equilibrium position of said pulley is a predetermined distance from an end stop position in the direction of said tensioner bias corresponding to a predetermined length of fiber optic cable being wrapped around said overhead line, whereby said substantially constant tension is maintained in the fiber optic cable on backward movement of said carriage, as said predetermined length of cable is pulled back from the overhead line.

* * * * *